(12) United States Patent
Gleeson et al.

(10) Patent No.: US 8,295,038 B2
(45) Date of Patent: Oct. 23, 2012

(54) SYSTEM AND METHOD FOR VARIABLE FORM HANDHELD COMPUTER CONFIGURABLE VIA MODULAR KEYBOARD

(75) Inventors: Michael Gleeson, Whitby (CA); Dinesh Nataly Gandhi, Brampton (CA)

(73) Assignee: Psion Inc., Mississauga (CA)

( * ) Notice: Subject to any disclaimer, the term of this patent is extended or adjusted under 35 U.S.C. 154(b) by 362 days.

(21) Appl. No.: 12/713,527

(22) Filed: Feb. 26, 2010

(65) Prior Publication Data
US 2011/0211308 A1  Sep. 1, 2011

(51) Int. Cl.
H05K 5/00 (2006.01)
H04M 1/00 (2006.01)
G06F 3/02 (2006.01)
G06F 3/033 (2006.01)

(52) U.S. Cl. ......... 361/679.11; 361/679.13; 361/679.16; 361/679.17; 455/575.1; 455/575.3; 455/575.4; 455/575.8; 345/168; 345/169; 345/184

(58) Field of Classification Search ............. 361/679.01, 361/679.02, 679.08, 679.09, 679.3, 679.55–679.59; 455/575.1, 575.3, 575.4, 575.8; 369/282, 369/291, 253, 44.16, 75.5
See application file for complete search history.

(56) References Cited

U.S. PATENT DOCUMENTS

| 2003/0038786 A1* | 2/2003 | Nguyen et al. | 345/169 |
| 2005/0105258 A1* | 5/2005 | Tanaka et al. | 361/681 |

* cited by examiner

Primary Examiner — Jayprakash N Gandhi
Assistant Examiner — Jerry Wu
(74) Attorney, Agent, or Firm — Perry + Currier Inc.

(57) ABSTRACT

A variable form handheld computer may be configurable either as a short form handheld computer or as long form handheld computer. The variable form handheld computer comprises a variable form housing frame configurable as either a short form housing frame or a long form housing frame. The variable form housing frame comprises a plurality of handheld computing modules comprising a display module, a circuitry module, a battery module and a variable form keyboard, the variable form keyboard configurable either as a short form keyboard or a long form keyboard. The long form housing frame securely frames the handheld computing modules when the variable form keyboard is configured as the long form keyboard, and the short form housing frame securely frames the plurality of computing modules when the variable form keyboard is configured as the short form keyboard. The variable form handheld computer is configurable as the long form handheld computer using the long form housing frame, and is configurable as the short form handheld computer using the short form housing frame.

9 Claims, 3 Drawing Sheets

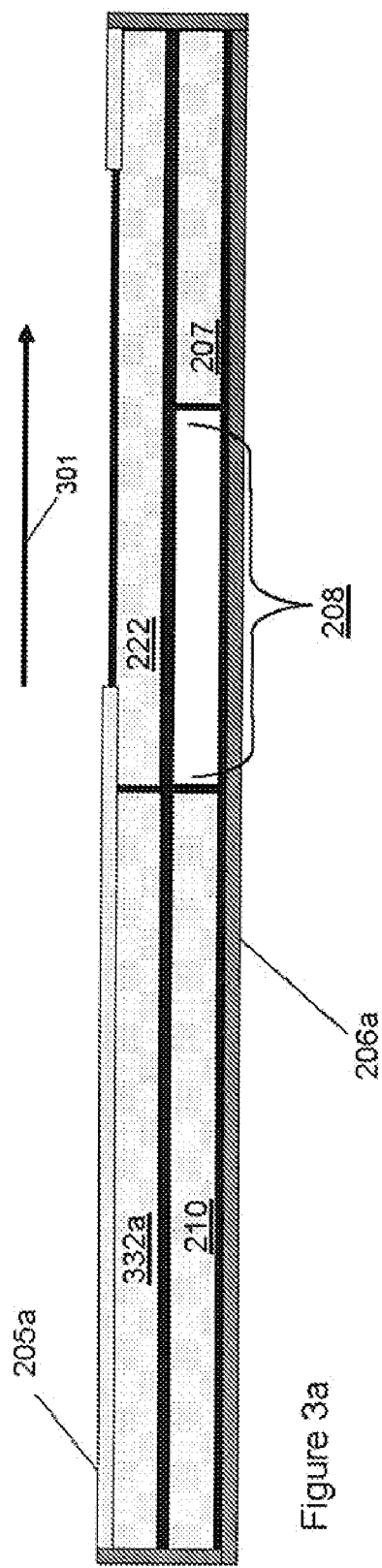
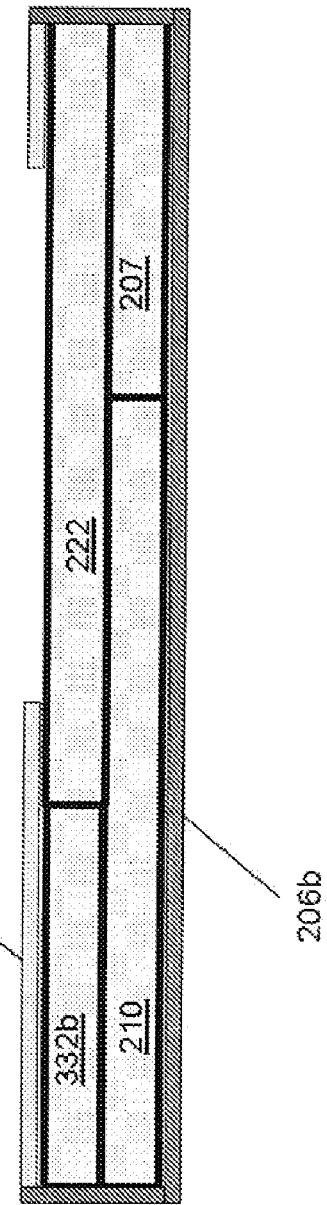
Figure 3a
Figure 3b

SYSTEM AND METHOD FOR VARIABLE FORM HANDHELD COMPUTER CONFIGURABLE VIA MODULAR KEYBOARD

FIELD

The present disclosure relates generally to a method and apparatus for configuring variable-form handheld computing devices via use of modular keyboards, while maximizing commonality of other functional or mechanical modules used in the variable-form handheld computing device.

BACKGROUND

Handheld mobile computing devices have proliferated as their usefulness and functionality have improved. To the extent that the handheld device may be configurable or customizable for different classes of user, the utility the devices is enhanced.

Handheld computers are available with various means of user input functionality. For example, touch screen displays may be especially desirable for applications where keyboard and mouse systems do not allow a satisfactory, intuitive, rapid, or accurate interaction by the user with the display's content. The touch screen enables a user to interact directly with the information displayed on the display screen, rather than indirectly in the case of a mouse or touchpad. For such classes of users, it is contemplated that a full functionality keyboard may not be necessary. Accordingly, such a class of user may prefer not to incur the cost of a full functionality keyboard, given their needs or applications for handheld computing.

It would therefore be advantageous for a manufacturer of handheld computers to provide a handheld computer having different variations of keyboard functionality suited to the needs of different classes of users, while maximizing commonality of other components of the handheld computer.

SUMMARY OF THE INVENTION

Provided is a variable form housing frame of a handheld computer, the variable form housing frame configurable as either a short form housing frame or a long form housing frame. The variable form housing frame comprises a plurality of handheld computing modules, the plurality of handheld computing modules comprising a display module, a circuitry module, a battery module; and a variable form keyboard, the variable form keyboard configurable either as a short form keyboard or a long form keyboard, wherein the long form housing frame securely frames the plurality of handheld computing modules when the variable form keyboard is configured as the long form keyboard, and the short form housing frame securely frames the plurality of computing modules when the variable form keyboard is configured as the short form keyboard.

Also provided is a variable form handheld computer configurable either as a short form handheld computer or as long form handheld computer. The variable form handheld computer comprises a variable form housing frame, the variable form housing frame configurable as either a short form housing frame or a long form housing frame. The variable form housing frame comprises a plurality of handheld computing modules comprising a display module, a circuitry module, a battery module and a variable form keyboard, the variable form keyboard configurable either as a short form keyboard or a long form keyboard, wherein the long form housing frame securely frames the plurality of handheld computing modules when the variable form keyboard is configured as the long form keyboard, and the short form housing frame securely frames the plurality of computing modules when the variable form keyboard is configured as the short form keyboard, and wherein the variable form handheld computer is configurable as the long form handheld computer using the long form housing frame, and the variable form handheld computer is configurable as the short form handheld computer using the short form housing frame.

Also provided is a method for assembling a variable form housing frame of a handheld computer, the variable form housing frame configurable as either a short form housing frame or a long form housing frame. The method comprises providing a plurality of handheld computing modules, the plurality of handheld computing modules comprising: a display module, a circuitry module, a battery module; providing a variable form keyboard, the variable form keyboard providable in either a short form keyboard or a long form keyboard; and assembling the variable form housing frame either as a long form housing frame or as a short form housing frame, wherein the assembled long form housing frame securely frames the plurality of handheld computing modules including the long form keyboard, and the assembled short form housing frame securely frames the plurality of computing modules including the short form keyboard.

BRIEF DESCRIPTION OF THE DRAWINGS

Embodiments will now be described by way of example only, with reference to the following drawings in which:

FIG. 3*a* is a conceptual diagram showing an exemplary long form configuration of the variable form handheld computer; and FIG. 3*b* is a conceptual diagram showing an exemplary short form configuration of the variable form handheld computer.

DETAILED DESCRIPTION

It would be advantageous to provide a handheld computer which is configurable via varying form factor keyboards while maximizing commonality of other components or functional modules of the handheld computer.

In addition to providing increased customer choices within a given and familiar handheld computer platform, by maximizing commonality of components, a manufacturer is able to minimize the number of different input raw materials needed, positively impacting manufacturing expenses. Such a solution would also enable late-stage customization of handheld computers having keyboards of different form factors during the manufacturing assembly process. Providing such late-stage customization or configuration capability also positively affects the component inventory carrying costs for inventory that a manufacturer needs to have on hand to support manufacturing assembly and production of differing versions or families of handheld computers.

Figure 1:
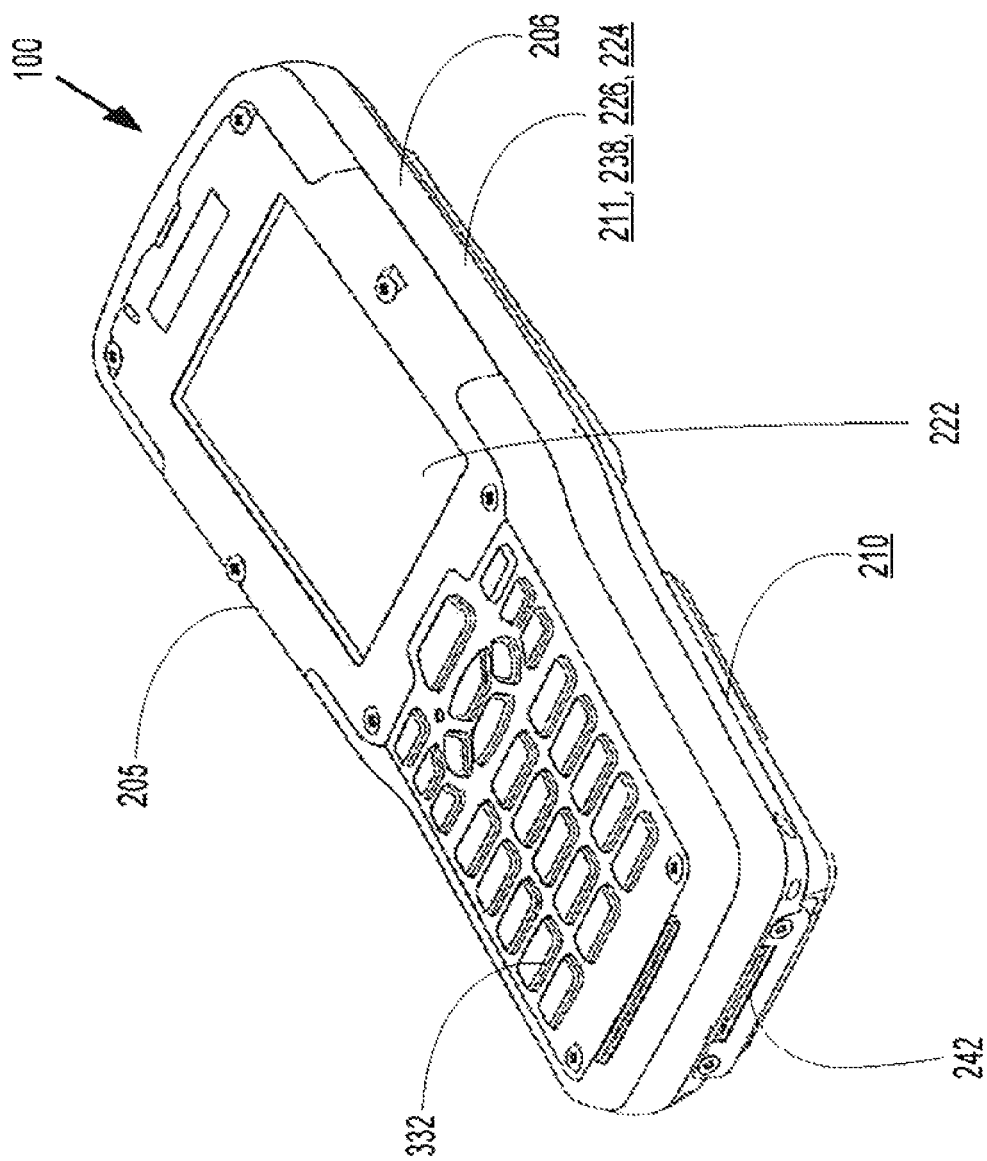
FIG. 1 illustrates an exemplary variable form handheld device having a modular keyboard.

Referring now more particularly to the accompanying figures, FIG. 1 illustrates an exemplary embodiment of a variable form handheld computer 100 having a modular keyboard 332. Variable form handheld computer 100 will be referred to variously and interchangeably as a handheld computer, a handheld device, a mobile computer, a mobile device or handheld computing device in the disclosure herein. The variable form handheld computer 100 may have the capability of communicating at least data, and possibly both data and audio, to and from servers as well as data acquisition sources within a communication network.

Still with reference to FIG. 1, the variable form handheld computer 100 may comprise a housing frame, the housing frame comprising top bezel housing frame 205 and a bottom bezel housing frame 206. In one embodiment, top bezel housing frame 205 may be detachably coupled to bottom bezel housing frame 206. The top bezel housing frame 205 may house a modular keyboard 332, meaning that keyboard 332 may be selected from a family of keyboards having varying dimensional form factors, lengths, or sizes.

Keyboard module 332, as will be described in more detail later, and as depicted in exemplary manner in FIGS. 3a and 3b, may be configured as either a long form keyboard 332a or a short form keyboard 332b.

In one embodiment depicted in FIG. 1, top bezel housing frame 205 may securely house keyboard module 332 and display screen module 222. By use of the term "house", it is meant that a module, such as keyboard module 332 and display screen module 222, are substantially located or disposed within top bezel housing frame 205. By substantially, it is meant at least 60% of the volumetric footprint of any module, including keyboard module 332 and display screen module 222. Keyboard module 332 and display screen module 222 may be located physically abutting each other, in a generally coplanar disposition as depicted in FIG. 1, and also in FIGS. 3a, 3b.

Continuing with the embodiment depicted in exemplary manner in FIG. 1, bottom bezel housing frame 206 may house battery module 210 and circuitry module 207. Again, by use of the terms "house" or "housing" as verbs, it is meant that a module, including battery module 210 and circuitry module 207, are substantially located or disposed within bottom bezel housing frame 206. Circuitry module 207 may include any combination of electronic componentry of the handheld computer 100, such as any combination of wireless communication subsystem 211, microprocessor 238, random access memory 226 and flash memory 224. However, it will be appreciated by those of skill in the art that circuitry module 207 may not exclusively house all of the electronic components and interconnections necessary for handheld computer 100 to function as intended.

In one embodiment, bottom bezel housing frame 206 may completely, or partially, house a connector slot 242 whereby an external power source may be electrically coupled to the electrical contacts of a rechargeable embodiment of battery module 210. It is also contemplated that connector slot 242 may provide electrical and/or mechanical coupling means for receiving handheld computer in a cradle peripheral device, such as for data synchronization with other computing devices or servers, and for electrical power charging.

Figure 2:
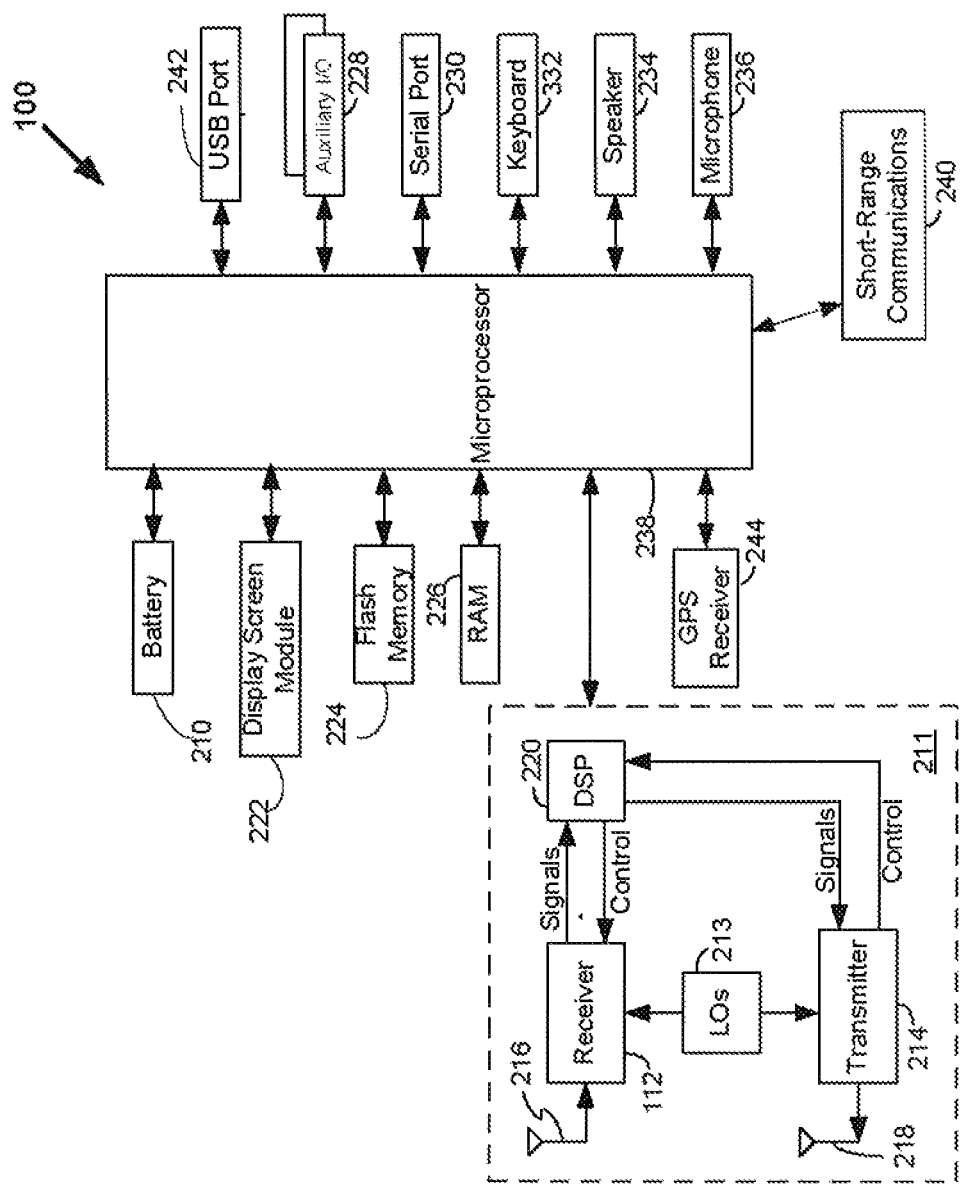
FIG. 2 is an exemplary conceptual diagram illustrating an embodiment of the components and functional subsystems of the variable form handheld device.

Referring now to FIG. 2, an exemplary architecture of the variable form handheld computer 100 is shown. Variable form handheld computer 100 may include wired or wireless communication capability. In the wireless configuration, handheld computer 100 typically includes radio frequency (RF) communication subsystem 211, which includes a receiver 212, a transmitter 214, and associated components, such as one or more embedded or internal antenna elements 216 and 218, local oscillators (LOs) 213, and a processing module such as a digital signal processor (DSP) 220. As will be apparent to those skilled in field of communications, the particular design of the RF communication subsystem 211 depends on the specific communication network in which environment control device 100 is intended to operate, but may include communication functionalities such as radio-frequency identification (RFID), Wi-Fi WLAN based on IEEE 802.11 standards, Zigbee, Zwave and the like.

The handheld device 100 includes a microprocessor 238 which controls general operation of the handheld device 100. The microprocessor 238 also interacts with functional device subsystems such as screen display module 222, a flash memory 224, random access memory (RAM) 226, auxiliary input/output (I/O) subsystems 228, serial port 230, keyboard module 332, speaker 234, microphone 236, short-range communications subsystem 240 such as Bluetooth™ for example, and Universal Serial Bus (USB) expansion port 242 for peripheral. The handheld device 100 may include a power source such as battery module 210 which may also be removable and replaceable from the handheld device. The handheld device 100 may also include a positioning device 244, such as a GPS receiver for example, for receiving positioning information.

Still with regard to FIG. 2, operating system software used by the microprocessor 238 may be stored in a persistent store such as the flash memory 224, which may alternatively be a read-only memory (ROM) or similar storage element (not shown). Those skilled in the art will appreciate that the operating system, specific device applications, or parts thereof, may be temporarily loaded into a volatile store such as RAM 226.

The microprocessor 238, in addition to its operating system functions, enables execution of software applications on the handheld device 100. A predetermined set of applications, which control basic device operations, may be installed on the handheld device 100 during its manufacture. These basic operations typically include data and voice communication applications, for example. Additionally, applications may also be subsequently loaded onto the handheld device 100 through the communication subsystem 211, an auxiliary I/O subsystem 228, serial port 230, USB port 242, short-range communications subsystem 240, or any other suitable subsystem, and installed by a user in RAM 226, or the persistent store 224, for execution by the microprocessor 238. Such flexibility in application installation increases the functionality of the handheld device 100 and may provide enhanced on-device features, communication-related features, or both.

Display screen module 222 is used to visually present an application's graphical user interface (GUI) to the user via a display screen. The display screen module 222 may employ a touch screen display, in which case the user can manipulate application data by modifying information on the GUI using direct touches by finger. Depending on the type of handheld device 100, the user may have access to other types of input devices, such as, for example, a scroll wheel, trackball, light pen or touch sensitive screen.

FIGS. 3a and 3b depict an exemplary variable form handheld computer 100 configured by use of a variable form housing frame. While variable form is described herein in terms of long form and short form, and with reference to handheld computer 100, housing frame portions 205, 206 and keyboard module 332, it is contemplated that a family (meaning more than two) of form factors, or lengths, of housing frames and keyboards may be used to configure handheld computer 100 according to various desired form factors.

In FIG. 3a, an exemplary long form version of handheld computer 100, or long form handheld computer 100, is defined by use of a long form housing frame. The long form housing frame comprises a long form top bezel housing frame 205a detachably coupled (according to one embodiment) to a long form bottom bezel housing frame 206a. Long form top bezel housing frame 205a substantially houses a long form factor, or long form, keyboard 332a and display screen module 222. Long form keyboard module 332a and display screen module 222 lie in a generally planar disposition defined along a longitudinal axis 301, and in one embodiment as depicted, are in physical abutment. Long form bottom bezel 206a substantially houses battery module 210 and circuitry module 207 arranged in a generally coplanar disposition defined along longitudinal axis 301. In one embodiment depicted, battery module 210 and circuitry module 207 have a gap 208 therebetween.

In another embodiment, it is contemplated that circuitry module 207 may be selectable from among several options, depending on the form or option selected for keyboard module 332.

In FIG. 3b, an exemplary short form version of handheld computer 100, or short form handheld computer 100, is defined by use of a short form housing frame. The short form housing frame comprises a short form top bezel housing frame 205b detachably coupled (according to one embodiment) to a short form bottom bezel housing frame 206b. Short form top bezel housing frame 205b substantially houses a short form factor, or short form, keyboard 332b and display screen module 222. In one embodiment, short form keyboard module 332b and display screen module 222 lie in a generally planar disposition defined along longitudinal axis 30, and are in physical abutment. Short form bottom bezel housing frame 206b substantially houses battery module 210 and circuitry module 207 arranged in a generally coplanar disposition defined along longitudinal axis 301, and in the embodiment depicted, are in physical abutment.

In both embodiments of FIGS. 3a and 3b, the top and bottom bezel housing frame portions securely frame the plurality of handheld computing modules including the battery 210, display screen 222, and respective keyboard module 332a, 332b with circuitry module 207.

With regard to FIG. 3a, it is contemplated that the length of gap 208 is substantially representative of the difference in length between long form keyboard 332a and short form keyboard 332b, measured along longitudinal axis 301. In one embodiment, it is contemplated that the length of gap 208 may be at least a half an inch.

Long form keyboard 332a may comprise an alphanumeric keyboard including a plurality of alphanumeric input keys, such as the "Qwerty" keys including numeric keys, or representations of numeric keys, from zero through nine. It is contemplated that short form keyboard 332b will comprise only a subset of the input keys of long form keyboard 332a, depending on the class of user targeted by the manufacturer of handheld computer 100.

Still with regard to FIGS. 3a and 3b, the structure provided also allows for severability and reuse of display screen module 222, battery module 210 and circuitry module 207 during repair of the various models comprising the family of handheld computers, enhancing the practicability and economics of replacing individual components or modules.

Although a mobile or handheld computer has been used to establish a context for disclosure herein, it is contemplated as having much wider applicability within the field of handheld devices. Furthermore, the disclosure herein has been described with reference to specific exemplary embodiments; however, varying modifications thereof will be apparent to those skilled in the art without departing from the scope of the invention as defined by the appended claims.

What is claimed is:

1. A handheld computer comprising:
   a plurality of handheld computing modules comprising:
      a display module,
      a circuitry module,
      a battery module; and
      a keyboard selectable from a family of modular keyboards of different dimensions, each keyboard of the family of modular keyboards operable with the circuitry module, at least one keyboard of the family of modular keyboards having a plurality of alphanumeric keys and at least another keyboard of the family of modular keyboards having a subset of the alphanumeric keys; and
   a housing frame selectable from a plurality of housing frames based on the selected keyboard, the housing frame securely framing the plurality of handheld computing modules; and
   the display module and circuitry module stay in a same position when each of the modular keyboards with different dimensions is selected.

2. The handheld computer of claim 1 wherein the battery module comprises a rechargeable battery, the rechargeable battery including electrical contacts for electrical power charging when coupled to an external power source.

3. The handheld computer of claim 2 comprising a connector slot adapted to secure a connector for coupling the external power source to the electrical contacts of the rechargeable battery.

4. The handheld computer of claim 1 comprising a top bezel housing frame and a bottom bezel housing frame, the top bezel housing frame for detachably coupling to the bottom bezel housing frame, wherein the top and bottom bezel housing frames, when coupled, securely framing the plurality of handheld computing modules.

5. The handheld computer of claim 1 wherein the battery module extends co-planarly with the circuitry module with a substantial gap therebetween.

6. The handheld computer of claim 5 wherein the gap comprises a length substantially equal to the length differential between the keyboard having the plurality of alphanumeric keys and the keyboard having the subset of the alphanumeric keys as measured along a longitudinal axis of the variable form handheld computer.

7. The handheld computer of claim 1 wherein the battery module physically abuts the circuitry module, the battery module and the circuitry module extending generally co-planarly within the housing frame.

8. A method for assembling a handheld computer, the method comprising:
   providing a plurality of handheld computing modules, the plurality of handheld computing modules comprising:
      a display module,
      a circuitry module,
      a battery module;
   selecting a keyboard from a family of modular keyboards of different dimensions, each keyboard of the family of modular keyboards operable with the circuitry module, at least one keyboard of the family of modular keyboards having a plurality of alphanumeric keys and at least another keyboard of the family of modular keyboards having a subset of the alphanumeric keys;
selecting a housing frame from a plurality of housing frames based on the selected keyboard; and
assembling the housing frame and the plurality of handheld computing modules;
to securely frame the plurality of handheld computing modules including the selected keyboard; and the display module and circuitry module stay in a same position when each of the modular keyboards with different dimensions is selected.

9. The method of claim 8 further comprising providing a connector slot within the housing frame, the connector slot adapted to secure a connector for coupling an external power source to electrical contacts of the battery module.

* * * * *